United States Patent
Fujita et al.

(10) Patent No.: US 6,768,268 B2
(45) Date of Patent: Jul. 27, 2004

(54) DIMMER FOR VEHICLE USE

(75) Inventors: Masahiko Fujita, Fukui (JP); Tsurugi Sawai, Hyogo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/396,748

(22) Filed: Mar. 25, 2003

(65) Prior Publication Data

US 2003/0218425 A1 Nov. 27, 2003

(30) Foreign Application Priority Data

Mar. 26, 2002 (JP) ........................................ 2002-085261

(51) Int. Cl.⁷ .............................................. B60Q 1/00
(52) U.S. Cl. ........................... 315/77; 315/80; 315/178
(58) Field of Search ............................... 315/77, 80, 82, 315/76, 178, 224; 307/10.8, 10.1

(56) References Cited

U.S. PATENT DOCUMENTS

| | | | | | |
|---|---|---|---|---|---|
| 4,114,071 | A | * | 9/1978 | Thrower et al. | 315/226 |
| 6,107,787 | A | * | 8/2000 | Wand | 323/299 |
| 6,329,755 | B1 | * | 12/2001 | Nakade et al. | 315/82 |
| 6,337,675 | B1 | * | 1/2002 | Toffolo et al. | 345/77 |

* cited by examiner

*Primary Examiner*—Hoanganh Le
*Assistant Examiner*—Ephrem Alemu
(74) *Attorney, Agent, or Firm*—RatnerPrestia

(57) ABSTRACT

A dimmer for vehicle use of the present invention has a circuitry in which an output part of an amplifier in an oscillating circuit is grounded through a diode and a ground resistor in series, an anode of the diode is coupled to the output part, and a junction point between a cathode of the diode and the ground resistor is coupled to a non-inversion input part through a feedback resistor. The dimmer can subject stable brightness prevented from changing in response to ambient temperature in the simple and inexpensive circuitry.

2 Claims, 4 Drawing Sheets

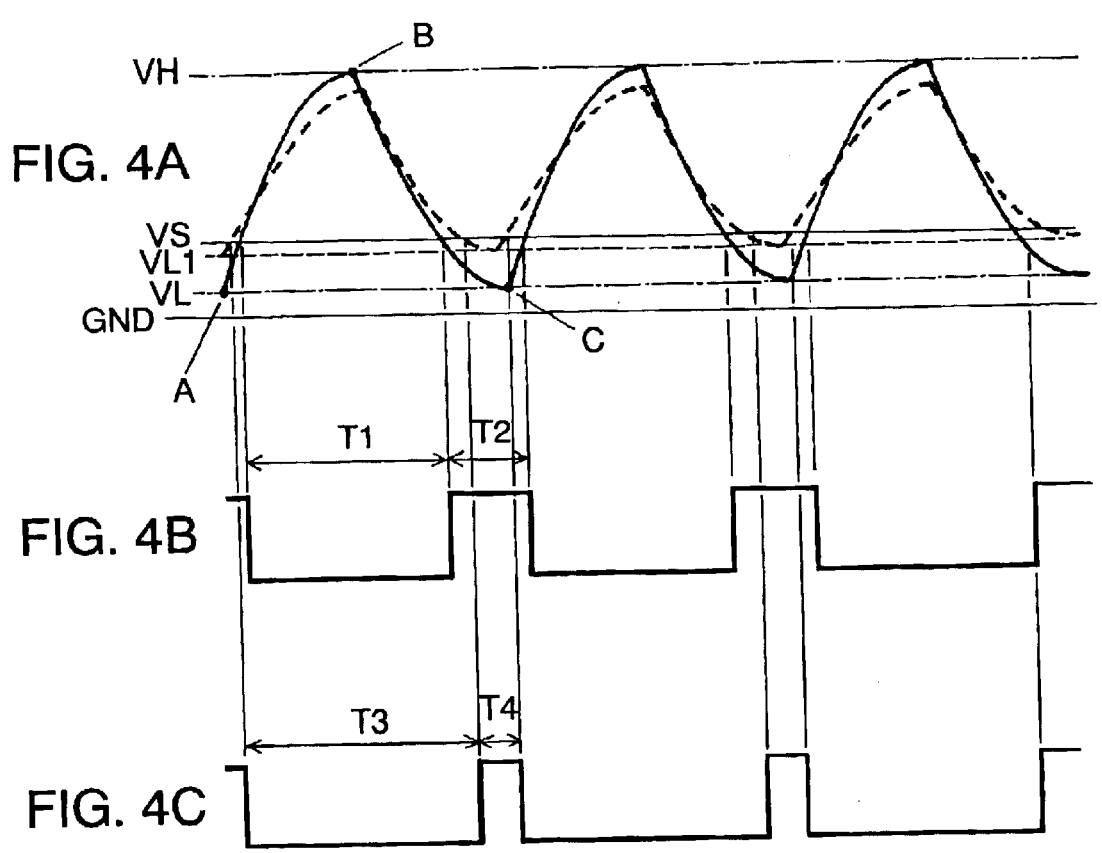

DIMMER FOR VEHICLE USE

BACKGROUND OF THE INVENTION

1. Field of the Invention

The present invention relates to a dimmer for vehicle use that is used for controlling illumination of a display panel or an operation panel of a vehicle.

2. Background Art

Recently, a dimmer for vehicle use that adjusts brightness of instruments and switches of a vehicle so that a driver easily looks at them in the nighttime or during running through a tunnel becomes widespread. The instruments include a speed meter and the like disposed in an instrument panel, and the switches include an air conditioner switch and a hazard switch.

Such a conventional dimmer for vehicle use is described with reference to FIG. 3, FIG. 4A, FIG. 4B, and FIG. 4C.

FIG. 3 is a circuit diagram of the conventional dimmer for vehicle use. In FIG. 3, conventional dimmer 16 includes the following elements:

oscillating circuit 1 for outputting voltage having a predetermined substantially triangular waveform, comparing circuits 2 for outputting voltage having a predetermined substantially rectangular waveform based on the voltage having the substantially triangular waveform supplied from oscillating circuit 1, and driving circuits 3 for performing so-called duty controlling, namely controlling timing of turning on or off power supply to a light emitting part such as lamp 14 or light emitting diode 15 in response to the substantially rectangular voltage from respective comparing circuits 2.

In oscillating circuit 1, power supply terminal 4 is grounded through resistor 5 and resistor 6 in series, and junction point 5A between resistor 5 and resistor 6 is coupled to non-inversion input part 7A of amplifier 7.

Output part 7C of amplifier 7 is coupled to non-inversion input part 7A through feedback resistor 8 and is grounded through resistor 9 and capacitor 10 in series.

Junction point 10A between resistor 9 and capacitor 10 is coupled to inversion input part 7B of amplifier 7 in oscillating circuit 1, and is coupled to each comparing circuit 2.

Junction point 10A of oscillating circuit 1 is coupled to inversion input part 11B of amplifier 11 of each comparing circuit 2. In each comparing circuit 2, an output terminal of variable resistor 12 coupled between power supply terminal 4 and the ground is coupled to non-inversion input part 11A, and output part 11C of amplifier 11 is coupled to each driving circuit 3.

Lamp 14 or light emitting diode 15 coupled to power supply terminal 13 for a light emitting part is coupled to each driving circuit 3 including a transistor or the like (not shown). Dimmer 16 for vehicle use has a circuitry discussed above.

In dimmer 16 having the circuitry, for example, when a switch (not shown) for a headlight is turned on to supply power from power supply terminal 4 to non-inversion input part 7A of amplifier 7 through resistor 5, amplifier 7 comes into a high output state and outputs a voltage of, for example about 7V, from output part 7C. Then, current flows to capacitor 10 through resistor 9 of amplifier 7 to charge capacitor 10.

The voltage then rises from point A to point B in a substantially triangular waveform shown in the output waveform graph of FIG. 4A, and the rising voltage is supplied to inversion input part 7B of amplifier 7.

While, the current from output part 7C of amplifier 7 flows through feedback resistor 8 and resistor 6. The non-inversion input voltage of non-inversion input part 7A reaches VH due to feedback resistor 8, resistor 5, and resistor 6, based on the output voltage of power supply terminal 4 and the high output voltage of output part 7C. Here, VH is indicated by an alternate long and short dash line in the top part of FIG. 4A.

When the high output voltage of output part 7C results in charging of capacitor 10 through resistor 9 and the voltage of inversion input part 7B reaches point B of non-inversion input voltage VH, amplifier 7 is inverted to a low output state.

At this time, output part 7C after the inversion to the low output state outputs a low voltage of about 0.6 V. Capacitor 10 thus discharges, current flows to output part 7C of amplifier 7 through resistor 9, and the output voltage decreases from point B to point C as shown in FIG. 4A.

At this time, current flows also from power supply terminal 4 to output part 7C of amplifier 7 through resistor 5 and feedback resistor 8. The non-inversion input voltage of non-inversion input part 7A reaches VL due to feedback resistor 8, resistor 6, and resistor 5, based on the output voltage of power supply terminal 4 and the low output voltage of output part 7C. Here, VL is indicated by an alternate long and short dash line in the bottom part of FIG. 4A.

When the voltage of capacitor 10 fed into inversion input part 7B decreases to voltage VL, amplifier 7 is inverted to the high output state and current flows from output part 7C of amplifier 7 to capacitor 10 to charge capacitor 10 again. Voltage having the substantially triangular waveform is therefore generated repeatedly at the same cycle and supplied from oscillating circuit 1 to each comparing circuit 2, as shown by the solid line of FIG. 4A.

In each comparing circuit 2, the voltage having the substantially triangular waveform fed into inversion input part 11B of amplifier 11 is compared with a comparison voltage that is set by operation of variable resistor 12 and fed into non-inversion input part 11A.

The set comparison voltage is assumed to be VS indicated by the solid line of FIG. 4A, for example. When the voltage having the substantially triangular waveform is higher than VS, output part 11C of amplifier 11 outputs a low voltage for period T1 as shown in FIG. 4B. When the voltage having the substantially triangular waveform is lower than VS, output part 11C outputs a high voltage for period T2. Voltage having a substantially rectangular waveform is supplied from each comparing circuit 2 in response to repeating of the voltage having the substantially triangular waveform as shown in FIG. 4B.

The voltage having the substantially rectangular waveform supplied from each comparing circuit 2 is then fed into each driving circuit 3, and power supply to lamp 14 or light emitting diode 15 is turned on or off in response to this voltage and timing.

For example, power is supplied at the duty ratio of OFF period T1 to ON period T2 to turn on lamp 14 or light emitting diode 15.

When the comparison voltage supplied to non-inversion input part 11A of amplifier 11 is changed by variable resistor 12, the period ratio of the low voltage to high voltage of the substantially rectangular voltage supplied from output part 11C of amplifier 11 changes in response to the set comparison voltage. The duty ratio in the power supply to lamp 14 or light emitting diode 15 therefore changes, so that brightness of lamp 14 or light emitting diode 15 changes to allow dimming.

When the comparison voltage is closed to non-inversion input voltage VH by variable resistor 12 in the conventional dimmer, the duty ratio of ON to OFF is increased to make lamp 14 or light emitting diode 15 bright. When the voltage is closed to voltage VL, the duty ratio of ON to OFF is decreased to make them dark.

In the conventional dimmer, amplifier 7 of oscillating circuit 1 is made of a semiconductor. The semiconductor generally has a negative temperature characteristic in which decreasing temperature promotes voltage drop, and thus the low output voltage of amplifier 7 rises at a low temperature, for example, in the winter season or when it is cold in the vehicle.

When the current flows to output part 7C of amplifier 7 through feedback resistor 8, the voltage variation of the low output also affects the non-inversion input voltage. For example, non-inversion input voltage VL rises to VL1 as shown by the substantially triangular waveform indicated by the dashed line of FIG. 4A.

When the comparison voltage of comparing circuits 2 is set to be VS and the non-inversion input voltage is VL, as discussed above, the power is supplied to lamp 14 or light emitting diode 15 under the condition where the OFF period is T1 and the ON period is T2. However, when the non-inversion input voltage is VL1, disadvantageously, as shown in FIG. 4C, the OFF period becomes T3 and the ON period becomes T4 to shorten the ON period, and lamp 14 or light emitting diode 15 becomes darker comparing with the initially set brightness.

SUMMARY OF THE INVENTION

The present invention provides a dimmer for vehicle use including the following elements:

an oscillating circuit that has an amplifier and a feedback resistor coupled between an output part of the amplifier and a non-inversion input part and outputs voltage having a predetermined substantially triangular waveform, a comparing circuit for outputting voltage having a predetermined substantially rectangular waveform based on the inputted voltage having the substantially triangular waveform, and a driving circuit for controlling power supply to a light emitting part in response to a period of high voltage and a period of low voltage of the inputted substantially rectangular voltage.

The output part of the amplifier in the oscillating circuit is grounded through a diode and a ground resistor in series, an anode of the diode is coupled to the output part, and a junction point between a cathode of the diode and the ground resistor is coupled to the non-inversion input part through the feedback resistor.

BRIEF DESCRIPTION OF THE DRAWINGS

FIG. 4A, FIG. 4B, and FIG. 4C are output waveform charts of the conventional dimmer.

DETAILED DESCRIPTION OF THE INVENTION

An exemplary embodiment of the present invention will be hereinafter described with reference to FIG. 1, FIG. 2A, and FIG. 2B.

Same elements used in the prior art are denoted with the same reference numbers, and their detailed descriptions are omitted.

Exemplary Embodiment

Figure 1:
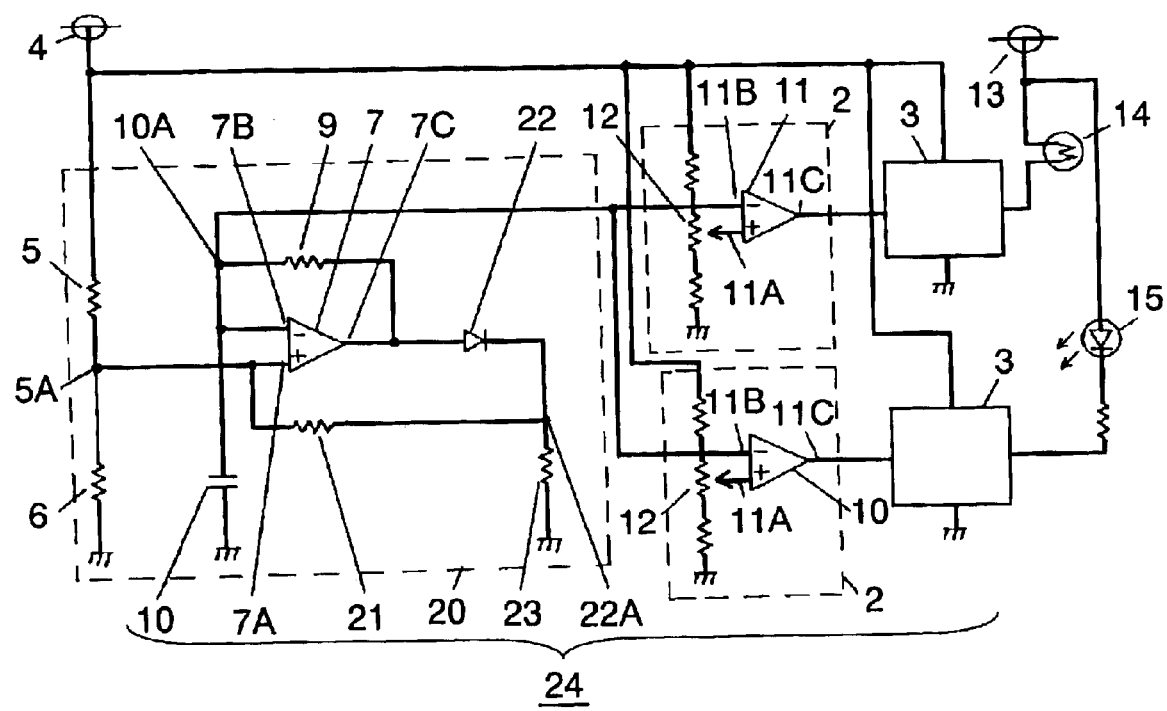
FIG. 1 is a circuit diagram of a dimmer for vehicle use in accordance with an exemplary embodiment of the present invention.

FIG. 1 is a circuit diagram of a dimmer for vehicle use in accordance with an exemplary embodiment of the present invention.

In FIG. 1, dimmer 24 for vehicle use includes the following elements:

oscillating circuit 20 for outputting voltage having a predetermined substantially triangular waveform, comparing circuits 2 for outputting voltage having a predetermined substantially rectangular waveform based on the voltage having the substantially triangular waveform supplied from oscillating circuit 20, and driving circuits 3 for performing so-called duty controlling, namely controlling timing of turning on or off power supply to a light emitting part such as lamp 14 or light emitting diode 15 in response to the substantially rectangular voltage from respective comparing circuits 2.

In oscillating circuit 20, power supply terminal 4 is grounded through resistor 5 and resistor 6 in series, and junction point 5A between resistor 5 and resistor 6 is coupled to non-inversion input part 7A of amplifier 7.

Output part 7C of amplifier 7 is grounded through diode 22 and ground resistor 23 in series, an anode of diode 22 is coupled to output part 7C, and junction point 22A between a cathode of diode 22 and ground resistor 23 is coupled to non-inversion input part 7A through feedback resistor 21.

In oscillating circuit 20, output part 7C of amplifier 7 is further grounded through resistor 9 and capacitor 10 in series, junction point 10A between resistor 9 and capacitor 10 is coupled to inversion input part 7B of amplifier 7 and coupled to each comparing circuit 2.

Junction point 10A of oscillating circuit 20 is coupled to inversion input part 11B of amplifier 11 of each comparing circuit 2. In each comparing circuit 2, an output terminal of variable resistor 12 coupled between power supply terminal 4 and the ground is coupled to non-inversion input part 11A, and output part 11C of amplifier 11 is coupled to each driving circuit 3.

Lamp 14 or light emitting diode 15 coupled to power supply terminal 13 for a light emitting part is coupled to each driving circuit 3 including a transistor (not shown). Dimmer 24 for vehicle use has a circuitry discussed above.

In dimmer 24 having the circuitry, for example, when a switch (not shown) for a headlight is turned on to supply power from power supply terminal 4 to non-inversion input part 7A of amplifier 7 through resistor 5, amplifier 7 comes into a high output state and outputs a voltage of, for example about 7V, from output part 7C. Then, current flows to capacitor 10 through resistor 9 to charge capacitor 10.

Figure 2:
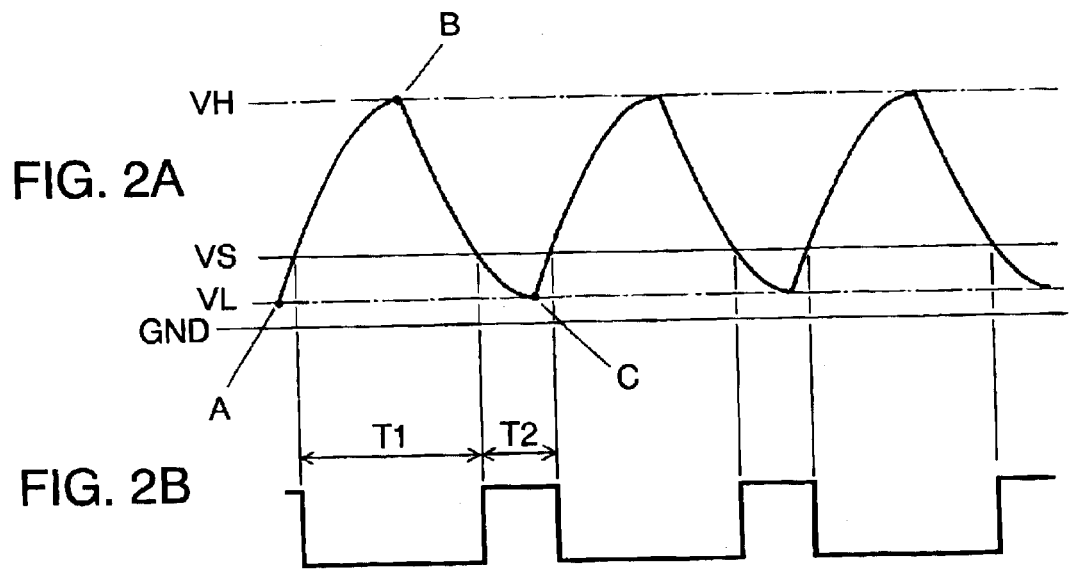
FIG. 2A and FIG. 2B are output waveform charts of the dimmer in accordance with the exemplary embodiment.
Figure 3:
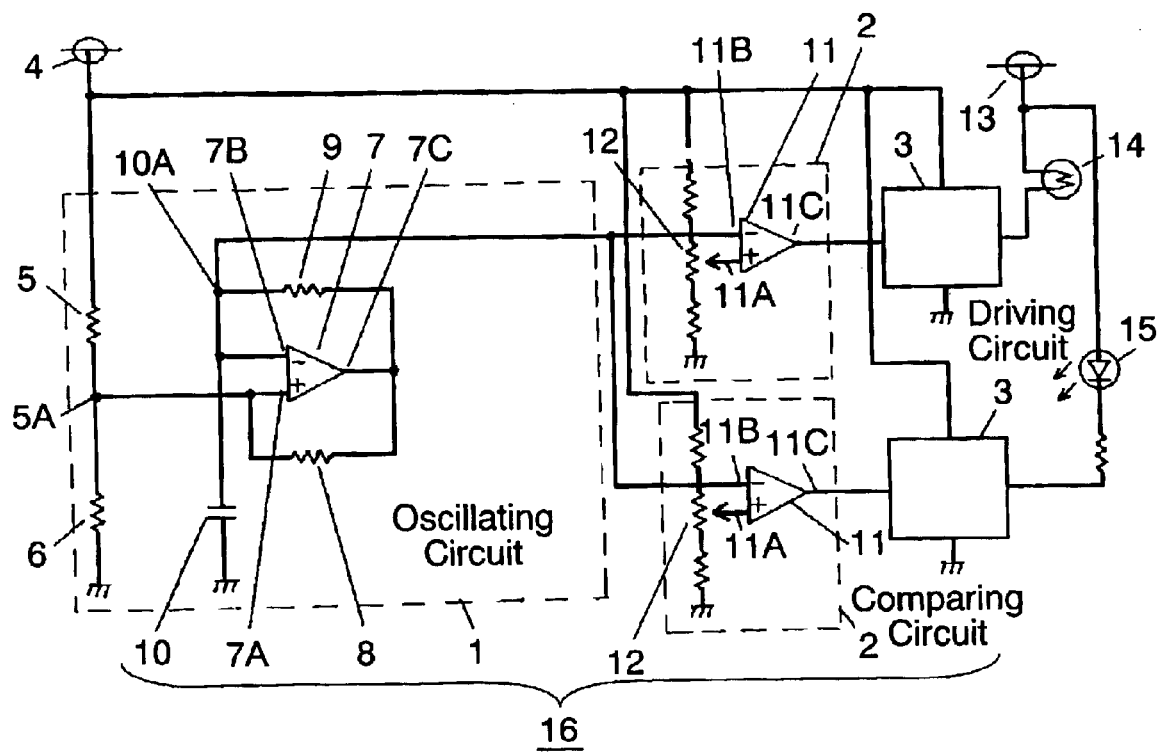
FIG. 3 is a circuit diagram of a conventional dimmer for vehicle use.

The voltage then rises from point A to point B in a substantially triangular waveform shown in the output waveform of FIG. 2A, and the rising voltage is supplied to inversion input part 7B of amplifier 7.

While, the current from output part 7C of amplifier 7 flows through diode 22. The current then flows from junction point 22A to feedback resistor 21 and resistor 6 and also flows to ground resistor 23.

At this time, the non-inversion input voltage of non-inversion input part 7A reaches VH due to resistors 5, 6, feedback resistor 21, and ground resistor 23, based on the output voltage of power supply terminal 4 and the high output voltage of output part 7C. Here, VH is indicated by an alternate long and short dash line in the top part of FIG. 2A.

When the high output voltage of output part 7C results in charging of capacitor 10 and the voltage of inversion input part 7B reaches point B of non-inversion input voltage VH, amplifier 7 is inverted to a low output state.

Output part 7C after the inversion to the low output state outputs a low voltage, for example about 0.6 V. Capacitor 10 thus discharges, current flows to output part 7C of amplifier 7 through resistor 9, and the output voltage decreases from point B to point C.

At this time, current flowing from power supply terminal 4 through resistor 5 and feedback resistor 21 does not flow to output part 7C because of reverse direction of diode 22, but flows to the ground through ground resistor 23. The non-inversion input voltage of non-inversion input part 7A reaches, for example, VL due to resistors 5, 6, feedback resistor 21, and ground resistor 23, based on only the voltage of power supply terminal 4. Here, VL is indicated by an alternate long and short dash line in the bottom part of FIG. 2A.

Therefore, the non-inversion input voltage is not affected by variation of low output voltage of amplifier 7 responsive to change of ambient temperature, but is stable voltage VL.

When the voltage of capacitor 10 fed into inversion input part 7B decreases to non-inversion input voltage VL, amplifier 7 is inverted to the high output state and current flows from output part 7C of amplifier 7 to capacitor 10 to charge capacitor 10 again. Voltage having the substantially triangular waveform is generated repeatedly at the same cycle and supplied from oscillating circuit 20 to each comparing circuit 2, as shown by the solid line of FIG. 2A.

In each comparing circuit 2, the voltage having the substantially triangular waveform fed into inversion input part 11B of amplifier 11 is compared with a comparison voltage that is set by operation of variable resistor 12 and fed into non-inversion input part 11A.

The set comparison voltage is assumed to be VS indicated by the solid line of FIG. 2A, for example. When the voltage having the substantially triangular waveform is higher than comparison voltage VS, output part 11C of amplifier 11 outputs a low voltage for period T1 as shown in FIG. 2B. When the voltage having the substantially triangular waveform is lower than comparison voltage VS, output part 11C outputs a high voltage for period T2. Voltage having a substantially rectangular waveform is supplied from each comparing circuit 2 in response to repeating of the voltage having the substantially triangular waveform as shown in FIG. 2B.

The voltage having the substantially rectangular waveform supplied from each comparing circuit 2 is then fed into each driving circuit 3, and power supply to lamp 14 or light emitting diode 15 is turned on or off in response to this voltage and timing.

For example, power is supplied at the duty ratio of OFF period T1 to ON period T2 to turn on lamp 14 or light emitting diode 15.

When the comparison voltage to non-inversion input part 11A of amplifier 11 is changed by variable resistor 12, the period ratio of the low voltage to high voltage of the substantially rectangular voltage supplied from output part 11C of amplifier 11 changes in response to the set comparison voltage. The duty ratio in the power supply to lamp 14 or light emitting diode 15 therefore changes, so that brightness of lamp 14 or light emitting diode 15 changes to allow dimming.

In the present embodiment, output part 7C of amplifier 7 in oscillating circuit 20 is grounded through diode 22 and ground resistor 23 in series, the anode of diode 22 is coupled to output part 7C, and junction point 22A between the cathode of diode 22 and ground resistor 23 is coupled to non-inversion input part 7A through feedback resistor 21. When amplifier 7 is in the low output state, therefore, the current from feedback resistor 21 to output part 7C is broken by diode 22 and flows to the ground through ground resistor 23. The non-inversion input voltage is not affected by the variation of the low output voltage responsive to change of ambient temperature but is stable, and oscillating circuit 20 thus outputs the stable voltage having the substantially triangular waveform. As a result, the dimmer for vehicle use has the simple and inexpensive circuitry and subjects the stable brightness prevented from changing in response to the ambient temperature.

As discussed above, the invention can provide a dimmer for vehicle use that has a simple and inexpensive circuitry and subjects stable brightness prevented from changing in response to ambient temperature.

What is claimed is:

1. A dimmer for vehicle use comprising:
    an oscillating circuit having
        an amplifier and
        a feedback resistor coupled between an output part of the amplifier and a non-inversion input part, and outputting voltage having a predetermined substantially triangular waveform,
    a comparing circuit for outputting voltage having a predetermined substantially rectangular waveform based on the inputted voltage having the substantially triangular waveform, and
    a driving circuit for controlling power supply to a light emitting part in response to a period of high voltage and a period of low voltage in the inputted substantially rectangular voltage,
    wherein an output part of the amplifier in said oscillating circuit is grounded through a diode and a ground resistor in series, an anode of the diode is coupled to the output part, and a junction point between a cathode of the diode and the ground resistor is coupled to the non-inversion input part through the feedback resistor.

2. A dimmer for vehicle use according to claim 1, wherein the light emitting part is a lamp or a light emitting diode.

* * * * *